US010953750B2

(12) United States Patent
Uenomachi et al.

(10) Patent No.: US 10,953,750 B2
(45) Date of Patent: Mar. 23, 2021

(54) INPUT DEVICE

(71) Applicant: Alps Alpine Co., Ltd., Tokyo (JP)

(72) Inventors: Takashi Uenomachi, Miyagi-ken (JP); Toshio Ogawa, Miyagi-ken (JP); Shinya Muto, Miyagi-ken (JP); Yoshitsugu Wakita, Miyagi-ken (JP); Ikuyasu Miyako, Miyagi-ken (JP); Wataru Kimura, Miyagi-ken (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 16/994,769

(22) Filed: Aug. 17, 2020

(65) Prior Publication Data

US 2020/0376963 A1  Dec. 3, 2020

Related U.S. Application Data

(63) Continuation of application No. PCT/JP2019/005116, filed on Feb. 13, 2019.

(30) Foreign Application Priority Data

Mar. 19, 2018 (JP) .............................. JP2018-051381

(51) Int. Cl.
*G05G 1/08* (2006.01)
*G05G 25/00* (2006.01)
(Continued)

(52) U.S. Cl.
CPC ............... *B60K 37/06* (2013.01); *G05G 1/10* (2013.01); *B60K 2370/126* (2019.05)

(58) Field of Classification Search
CPC .... B60K 37/06; B60K 2370/126; G05G 1/10; G05G 1/08; G05G 25/00; G05G 5/03;
(Continued)

(56) References Cited

U.S. PATENT DOCUMENTS 10,140,008 B2 * 11/2018 O'Mahony ............. G06F 3/021
2003/0006958 A1    1/2003 Onodera
(Continued)

FOREIGN PATENT DOCUMENTS

WO    WO 2019181287 A1 *  9/2019  ............... G05G 1/10
WO    WO 2019181288 A1 *  9/2019  ............... G05G 5/03

OTHER PUBLICATIONS

International Search Report for corresponding International Application No. PCT/JP2019/005116 dated May 7, 2019 (2 pages) with English translation.

*Primary Examiner* — Vinh Luong

(74) *Attorney, Agent, or Firm* — Harness, Dickey & Pierce, P.L.C.

(57) ABSTRACT

An input device includes a base member, a motor, a rotation shaft, a worm gear, a first gear, a second gear, an elastic member, a rotor, an angle detection unit, and a controller. The rotation shaft is rotated by the motor. The worm gear is unitarily rotated with the rotation shaft. The first gear is rotatable and engaged with the worm gear. The second gear is coaxial with the first gear. The elastic member generates urging force. The rotor is rotatable relative to the base member, includes a third gear engaged with the second gear, and is rotated by an operator. The angle detection unit detects a first rotation angle of the first gear and a second rotation angle of the second gear. The controller performs drive control for the motor to change a sense of force applied to the operator.

5 Claims, 11 Drawing Sheets

(51) Int. Cl.
*G05G 5/03* (2008.04)
*B60K 37/06* (2006.01)
*G05G 1/10* (2006.01)

(58) Field of Classification Search
CPC ....... G05G 2505/00; G06F 3/01; F16H 1/203;
F16K 31/047; F02D 9/02; F02D 9/12;
F02D 2009/0264
See application file for complete search history.

(56) References Cited

U.S. PATENT DOCUMENTS

| | | | |
|---|---|---|---|
| 2007/0159307 A1 | 7/2007 | Jannasch et al. | |
| 2009/0000407 A1* | 1/2009 | Meyer | F16H 59/08 |
| | | | 74/10.1 |
| 2015/0152958 A1* | 6/2015 | Watanabe | F16H 61/22 |
| | | | 74/473.12 |
| 2015/0308583 A1* | 10/2015 | Suzuki | F02D 9/1065 |
| | | | 74/665 A |
| 2018/0001763 A1* | 1/2018 | Kouzuma | F16D 11/16 |
| 2020/0191259 A1* | 6/2020 | Bagley | F16H 59/02 |
| 2020/0277082 A1* | 9/2020 | Grohmann | B64C 27/57 |

* cited by examiner

US 10,953,750 B2

INPUT DEVICE

CROSS REFERENCE TO RELATED APPLICATIONS

This application is a Continuation of International Application No. PCT/JP2019/005116 filed on Feb. 13, 2019, which claims benefit of Japanese Patent Application No. 2018-051381 filed on Mar. 19, 2018. The entire contents of each application noted above are hereby incorporated by reference.

BACKGROUND OF THE INVENTION

1. Field of the Invention

The present invention relates to an input device.

2. Description of the Related Art

There is provided a related-art sense of force generation input device that includes a shaft portion, a motor, a means for detecting rotation. The shaft portion holds an operation knob and is rotatably held by a bearing portion. The motor includes a motor shaft. The means for detecting rotation detects rotation of the operation knob. The shaft portion and the motor shaft are arranged beside each other. The sense of force generation input device also includes a first gear and a second gear. The first gear is attached to the shaft portion so as to be rotated by the operation knob. The second gear is rotated by the first gear and attached to the motor shaft. A sense of force from the motor is transmitted to the operation knob via the first and second gears (for example, see Japanese Unexamined Patent Application Publication No. 2003-022137 also published as Pub. No.: US 2003/0006958 A1).

SUMMARY OF THE INVENTION

The related-art sense of force generation input device generates the sense of force transmitted to the operator only with torque generated by the motor. Thus, the motor is required to generate large torque for transmitting the sense of force to the operator. Accordingly, there is a problem in that the size of the device increases.

Accordingly, a size-reduced input device is provided.

An input device according to an embodiment of the present invention includes a base member, a motor, a rotation shaft, a worm gear, a first gear, a second gear, an elastic member, a rotor, an angle detection unit, and a controller. The motor is attached to the base member. The rotation shaft is configured to be rotated by the motor. The worm gear is configured to be unitarily rotated with the rotation shaft. The first gear is provided so as to be rotatable relative to the base member and engaged with the worm gear. The second gear is provided so as to be coaxial with the first gear and so as to be rotatable relative to the base member. The elastic member is provided between the first gear and the second gear and configured to generate urging force in a direction in which a relative angle between the first gear and the second gear from a reference angle state in a rotation direction is reduced. The rotor is provided so as to be rotatable relative to the base member, includes a third gear engaged with the second gear, and is configured to undergo rotation operation performed by an operator. The angle detection unit is configured to detect a first rotation angle of the first gear and a second rotation angle of the second gear. The controller is configured to perform drive control for the motor in accordance with a relative angle between the first rotation angle and the second rotation angle so as to change a sense of force applied to the operator via the rotor.

The size-reduced input device can be provided.

BRIEF DESCRIPTION OF THE DRAWINGS

FIG. 9 corresponds to a part of the illustration of FIG. 1 when obliquely upwardly viewed from a bottom of the seating 120;

DESCRIPTION OF THE PREFERRED EMBODIMENTS

An embodiment to which an input device according to the present invention is applied will be described.

Embodiment

Figure 1:
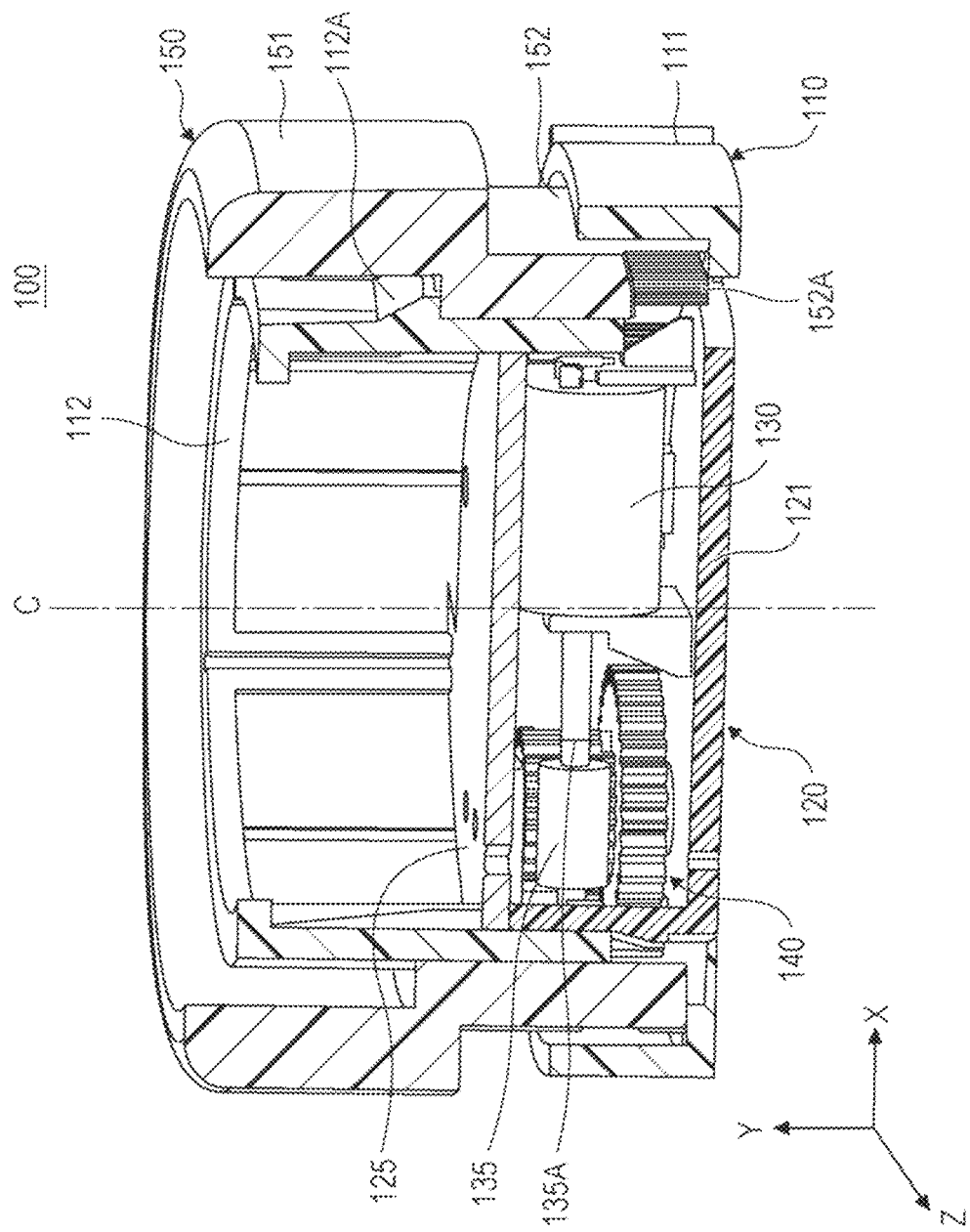
FIG. 1 is a sectional view illustrating an input device according to an embodiment along the line I-I shown in FIG. 2. Note that the base plate 125 shown in FIG. 1 is omitted from FIG. 2.

FIG. 1 is a sectional view illustrating an input device 100 according to an embodiment. The input device 100 includes a base portion 110, a seating 120, a base plate 125, a motor 130, a worm gear 135, a gear unit 140, and a rotor 150.

Figure 2:
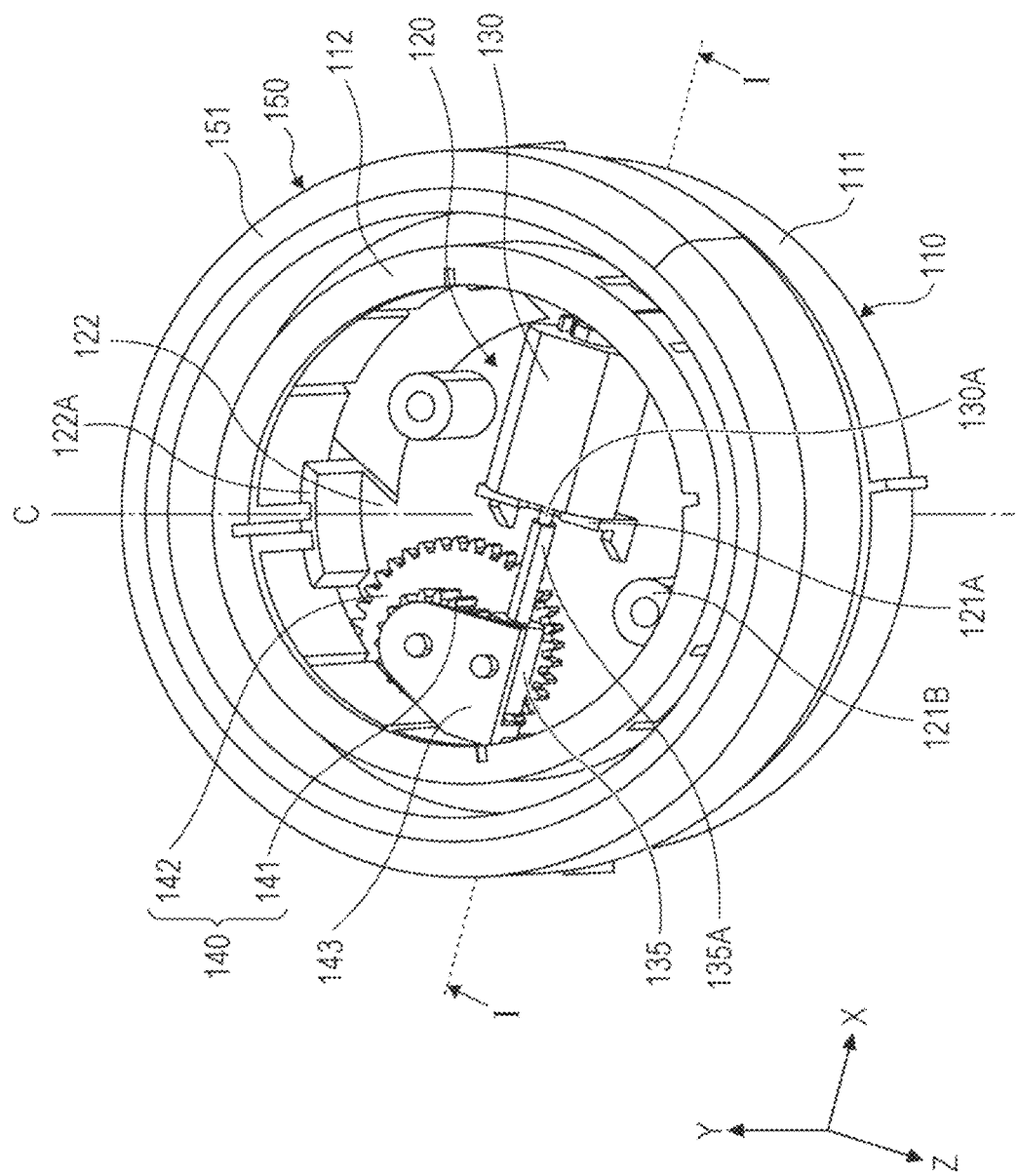
FIG. 2 is a perspective view illustrating a structure with a base plate removed from the input device.
Figure 3:
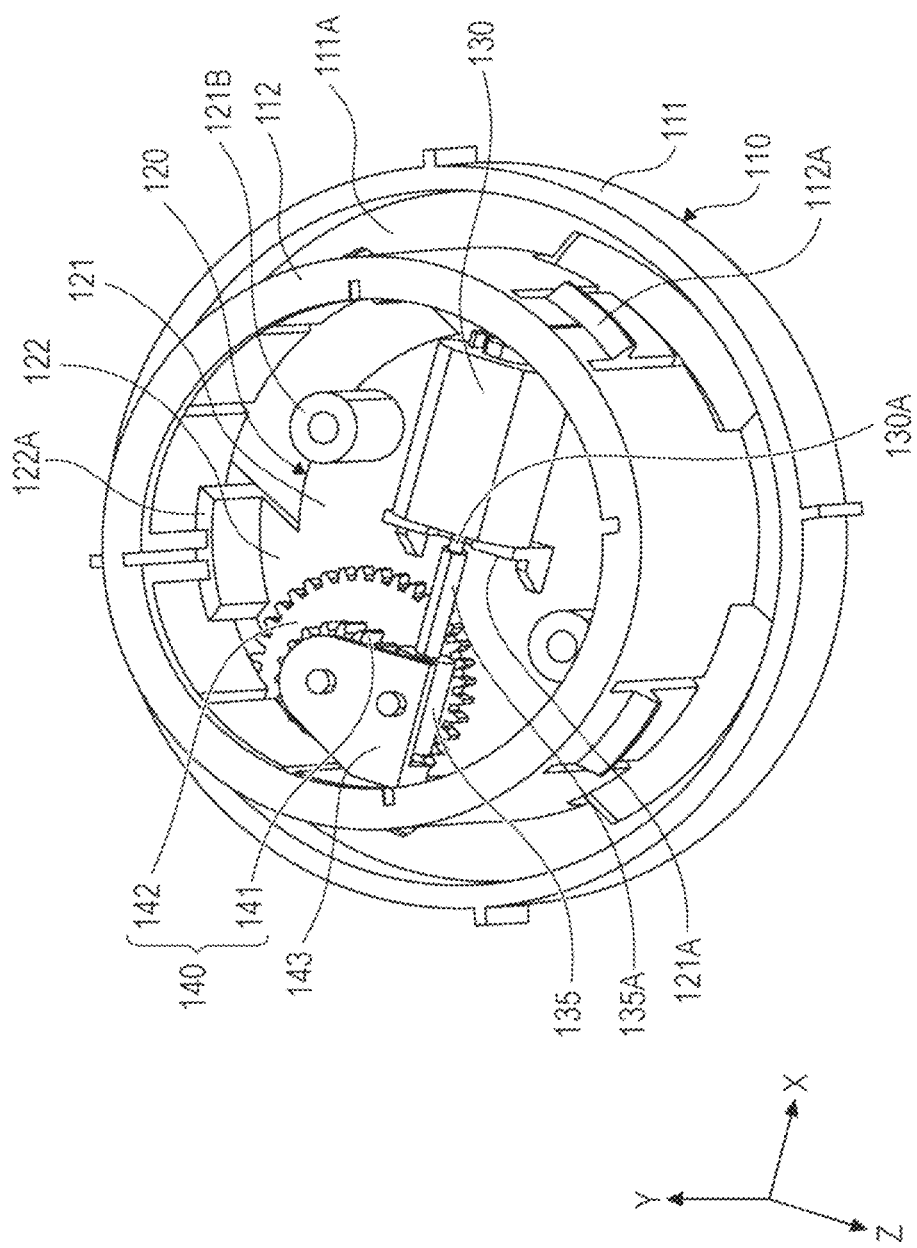
FIG. 3 is a perspective view illustrating the structure with a rotor removed from FIG. 2.
Figure 4:
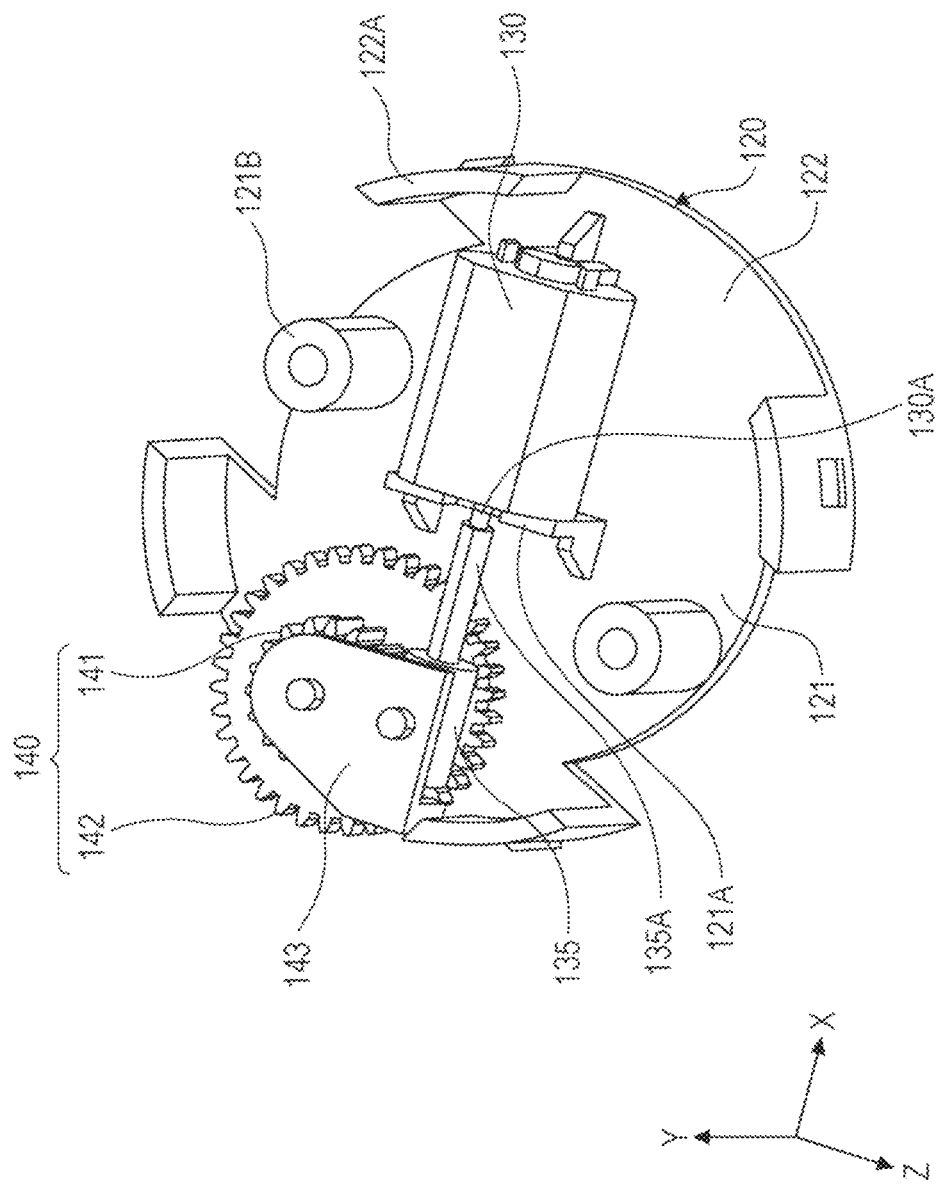
FIG. 4 is a perspective view illustrating the structure with a base portion removed from FIG. 3.

The following description will be made with reference to FIGS. 2 and 10 in addition to FIG. 1. FIG. 2 is a perspective view illustrating a structure with the base plate 125 removed from the input device 100. FIG. 1 illustrates a section corresponding to a section taken along line I-I in FIG. 2, looking in the direction of arrows. FIG. 3 is a perspective view illustrating the structure with the rotor 150 removed from FIG. 2. FIG. 4 is a perspective view illustrating the structure with the base portion 110 removed from FIG. 3.

The input device 100 further includes a torsion spring 160 (see FIGS. 5, 6, and 7), angle sensors 170 (see FIG. 9), and a controller in addition to the above-described elements. The controller will be described after elements of various units are described with reference to FIGS. 1 to 10.

Figure 5:
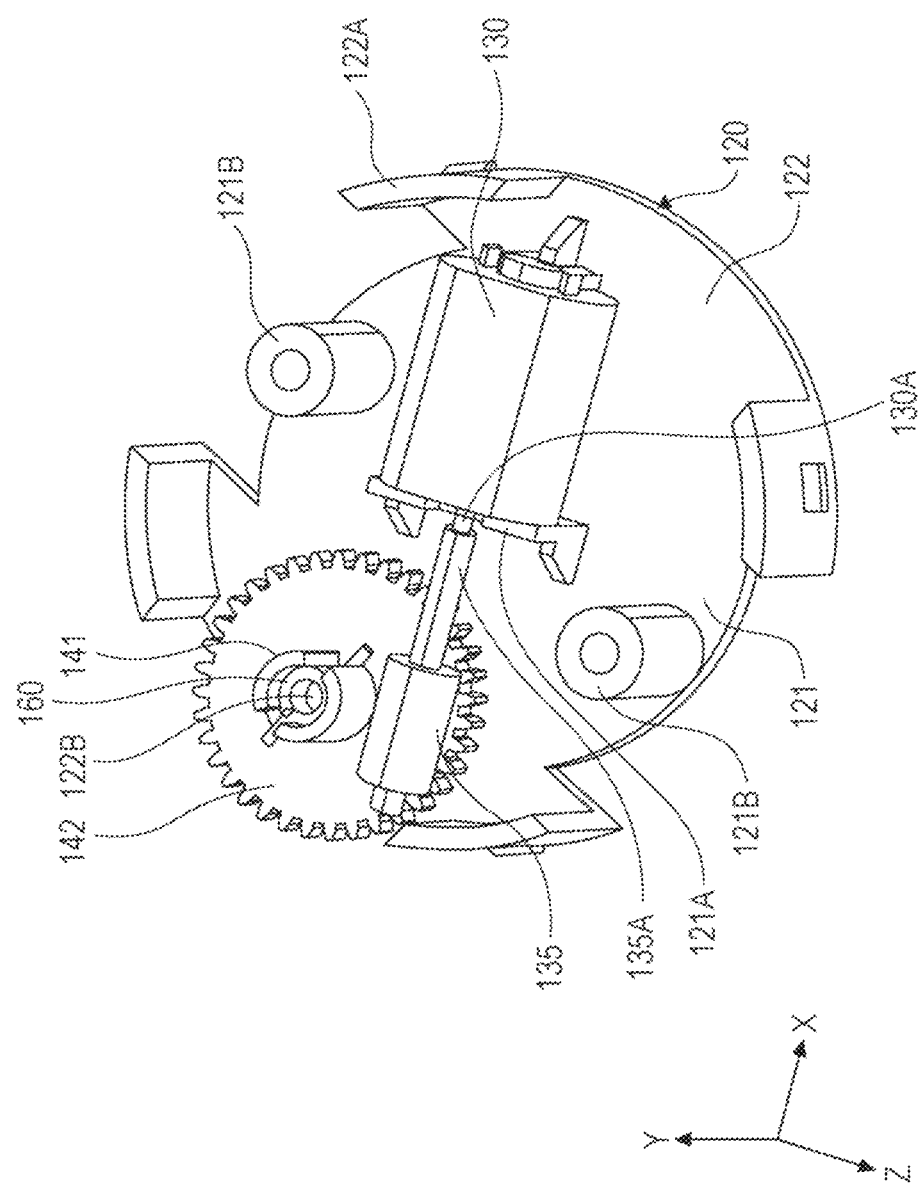
FIG. 5 is a perspective view illustrating the structure with part of a gear unit removed from the input device.
Figure 9:
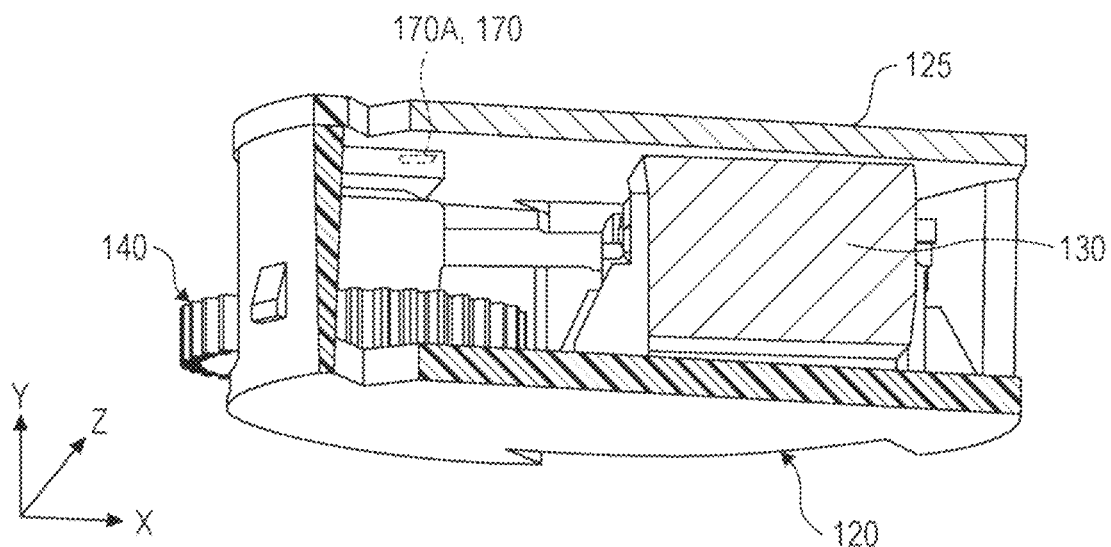
FIG. 9 is a sectional view showing the angle sensors.

FIG. 5 is a perspective view illustrating the structure with part of the gear unit 140 removed from the input device 100. FIGS. 6 to 8B illustrate the structure with part of the gear unit 140 removed and the torsion spring 160. FIGS. 9 to 10 illustrate the angle sensors 170.

Hereinafter, common XYZ coordinates are used for description throughout the drawings. Furthermore, XZ plane view is referred to as "plan view". Also hereinafter, although the Y-axis positive direction may also be referred to as "up" and the Y-axis negative direction may also be referred to as "down" for convenience of description, these do not represent a universal up-down direction. Also for convenience of description, a position in the Y direction may also be represented in height. A most positive side in the Y-axis direction is a top portion and a most negative side in Y is a bottom portion.

In the following description, a central axis C (see FIG. 1) is common to the base portion 110, the seating 120, and the rotor 150. In plan view, these members have respective circular shapes, and the central axis C passes through the centers of these circular shapes. The central axis C is parallel to the Y axis.

For example, the input device 100 is mounted on a vehicle and used when remotely controlling operating portions and the like of graphic user interfaces (GUIs) displayed on operation screens of various devices such as a navigation device and an air conditioner displayed on display panels disposed around a dashboard. The input device 100 is disposed, for example, near the hands of the driver or an occupant in the passenger seat similarly to a center console of the vehicle. However, the form of use of the input device 100 is not limited to the form of use as described above.

The base portion 110 is a part at the base of the input device 100. The base portion 110 is an annular member a central axis of which is the central axis C in plan view. The base portion 110 has a cylindrical portion 111 provided on the outermost side in plan view and a cylindrical portion 112 provided inside the cylindrical portion 111 so as to be concentric with the cylindrical portion 111 in plan view. The cylindrical portions 111, 112 are cylindrical members center axes of which are the central axis C.

The cylindrical portion 112 is held by a connecting portions 111A that extend radially inward from a lower end (an end portion on the negative side in the Y-axis direction) of the cylindrical portion 111. The height of the cylindrical portion 112 is greater than the height of the cylindrical portion 111. Four connecting portions 111A are disposed so as to be equally spaced in a circumferential direction with gaps provided between the adjacent connecting portions 111A.

The base portion 110 supports the rotor 150 between the cylindrical portions 111 and 112 such that the rotor 150 is rotatable. Due to the cylindrical portions 111 and 112, the rotor 150 is rotated about the central axis C as a rotation central axis. Such a base portion 110 is formed of, for example, molded resin.

The seating 120 is provided inside the base portion 110 in plan view at an equal height to a bottom portion of the base portion 110 in the Y-axis direction. The seating 120 has a base plate portion 121 and extended portions 122. Such a seating 120 is formed of, for example, molded resin. The seating 120 is an example of a base member. The seating 120 may be integrally molded with adjacent parts disposed around the seating 120, for example, the base portion 110. The seating 120 itself may include a plurality of separate parts.

The base plate portion 121 is a circular plate-shaped member positioned at the center in plan view and has securing portions 121A, 121B. The motor 130 is secured to the securing portion 121A, and the base plate 125 is secured to the securing portions 121B.

Two extended portions 122 are connected to the base plate portion 121. One of the extended portions 122 flatly extends in the X-axis positive direction and the Z-axis positive direction relative to the base plate portion 121. The other extended portion 122 flatly extends in the X-axis negative direction and the Z-axis negative direction relative to the base plate portion 121.

Each of the extended portions 122 has two projections 122A on the outermost side in plan view. The projections 122A project in the Y-axis positive direction. Accordingly, four projections 122A are provided. The projections 122A are engaged with an inner circumferential surface of the cylindrical portion 112 of the base portion 110. In this way, the seating 120 is attached to the base portion 110. Also, the other extended portion 122 has a cylindrical shaft portion 122B that projects in the Y-axis positive direction. That is, the seating 120 has the shaft portion 122B. The gear unit 140 is rotatably supported by the shaft portion 122B (see FIG. 5).

The motor 130 is secured to the securing portion 121A provided on an upper surface (surface on the Y-axis positive side) of the base plate portion 121 of the seating 120. A drive shaft 130A of the motor 130 rotated by the motor 130 itself extends in the X-axis direction, and a rotation shaft 135A is connected to the drive shaft 130A so as to be unitarily rotated with the drive shaft 130A. Preferably, the drive shaft 130A of the motor 130 and the rotation shaft 135A are perpendicular to the central axis C. Although the drive shaft 130A and the rotation shaft 135A are separate parts according to the present embodiment, the drive shaft 130A and the rotation shaft 135A may be integrally formed.

The worm gear 135 is press-fitted to the rotation shaft 135A so as to be unitarily rotated with the drive shaft 130A and the rotation shaft 135A that extend in the X-axis direction. The worm gear 135 has a helical shape along the X axis and formed of molded resin or metal. A gear 142 of the gear unit 140 is meshed (engaged) with the worm gear 135. Although the worm gear 135 and the rotation shaft 135A are separate parts according to the present embodiment, the worm gear 135 and the rotation shaft 135A may be integrally formed.

The gear unit 140 is rotatably supported by the shaft portion 122B of the extended portion 122 of the seating 120. The gear unit 140 has a gear 141 and the gear 142. The torsion spring 160 is provided between the gear 141 and the gear 142. The torsion spring 160 is formed of a metal wire having a circular sectional shape and has linear end portions at both ends of a circular winding portion. These end portions extend in a tangential direction of the circle.

The gear 141 is meshed (engaged) with the worm gear 135 and is an example of a first gear. The gear 141 is a substantially cylindrical helical gear having a smaller outer diameter than that of the gear 142. The gear 141 has a hole portion 141A provided on the central axis C and cut portions 141B1 and 141B2 at an end portion on the Y-axis positive side and an end portion on the Y-axis negative side, respectively. The cut portions 141B1 and 141B2 each have a substantially sector shape radially outwardly cut from the hole portion 141A.

When a shaft portion 142B of the gear 142 is inserted into the hole portion 141A of the gear 141, the gear 141 is rotatably supported so as to be coaxial with the gear 142. Furthermore, a linear end portion 161A of the torsion spring 160 is engaged with the cut portion 141B1 of the gear 141, and a linear end portion 161B of the torsion spring 160 is engaged with the cut portion 141B2 of the gear 141. The widths of the cut portion 141B1 and the cut portion 141B2 are larger than the diameter of the metal wire of the torsion spring 160 in the circumferential direction, and the end portion 161A and the end portion 161B are movable in the circumferential direction. The end portion 161A is an example of one end portion of the torsion spring, and the end portion 161B is an example of another end portion of the torsion spring.

The gear 142 has a hole portion 142A, the shaft portion 142B, a cut portion 142C1, and a cut portion 142C2. The hole portion 142A is provided on the central axis. The shaft portion 142B extends in the Y-axis positive direction at or near the center of the gear 142 including the spur gear. The cut portion 142C1 and the cut portion 142C2 continue from an end portion on the Y-axis positive side to an end portion on the Y-axis negative side in the shaft portion 142B and each have a substantially sector shape radially outwardly cut from the hole portion 142A. The linear end portion 161A of the torsion spring 160 is engaged with the cut portion 142C1 of the gear 142, and the linear end portion 161B of the torsion spring 160 is engaged with the cut portion 142C2 of the gear 142. The gear 142 is meshed (engaged) with a gear 152A of the rotor 150. The gear 142 is an example of a second gear.

When the shaft portion 122B is inserted through the hole portion 142A of the gear 142, the gear 142 is rotatably supported. The shaft portion 142B of the gear 142 is a cylindrical member by which the hole portion 141A of the gear 141 is rotatably supported so as to be coaxial with the gear 142. The shaft portion 142B has an accommodation portion 142B1 that accommodates the winding portion of the torsion spring 160 on the central axis. The accommodation portion 142B1 is a cylindrical space having an inner diameter that matches the outer diameter of the winding portion of the torsion spring 160. Furthermore, the inner diameter of the winding portion of the torsion spring 160 is set to be larger than the shaft portion 122B.

According to the present embodiment, an angle formed between the end portion 161A and the end portion 161B of the torsion spring 160 is held in an enlarged state compared to a free state so as to set that force is generated in a direction in which both the end portions approach each other. Description herein assumes this setting. However, this setting is not limiting. Conversely, the angle formed between both the end portion may be held in a narrowed state compared to the free state so as to set that the force is generated in a direction in which both the end portions separate from each other.

Figure 6:
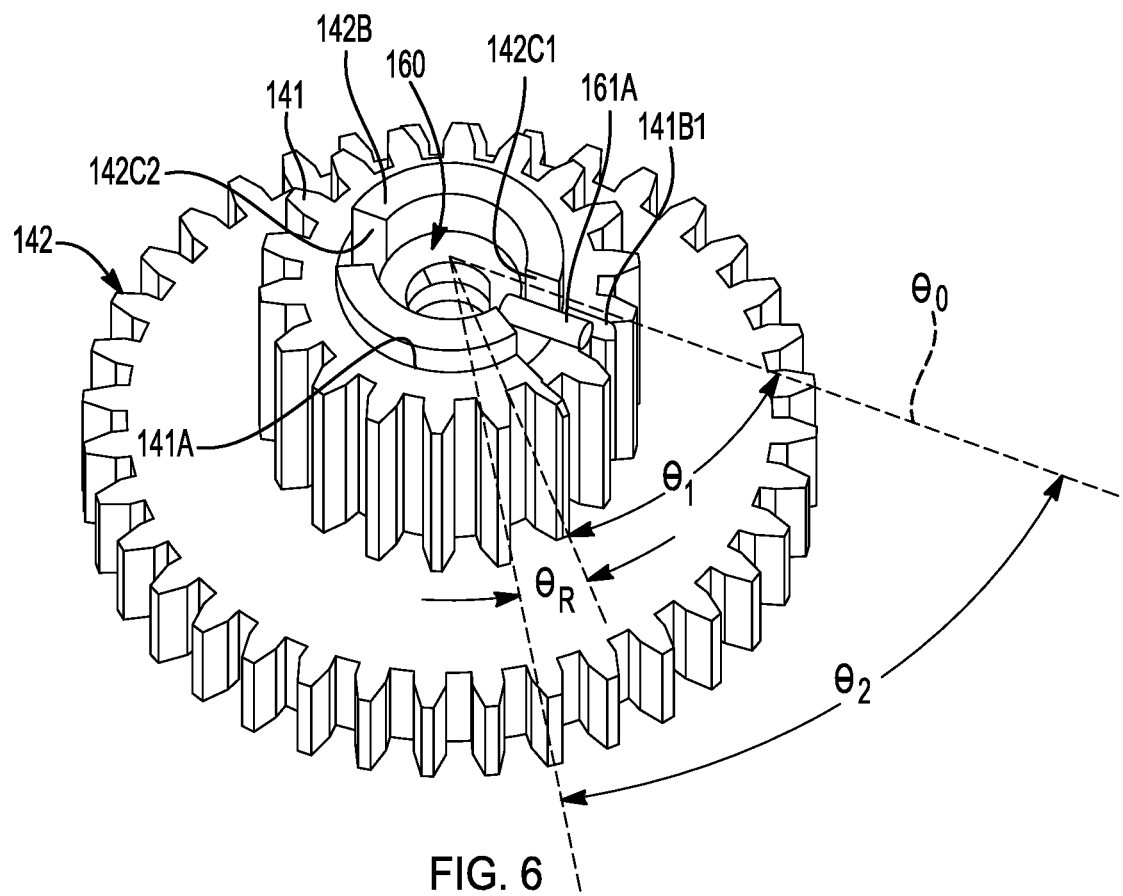
FIG. 6 illustrates the structure with part of the gear unit removed and a torsion spring.
Figure 7:
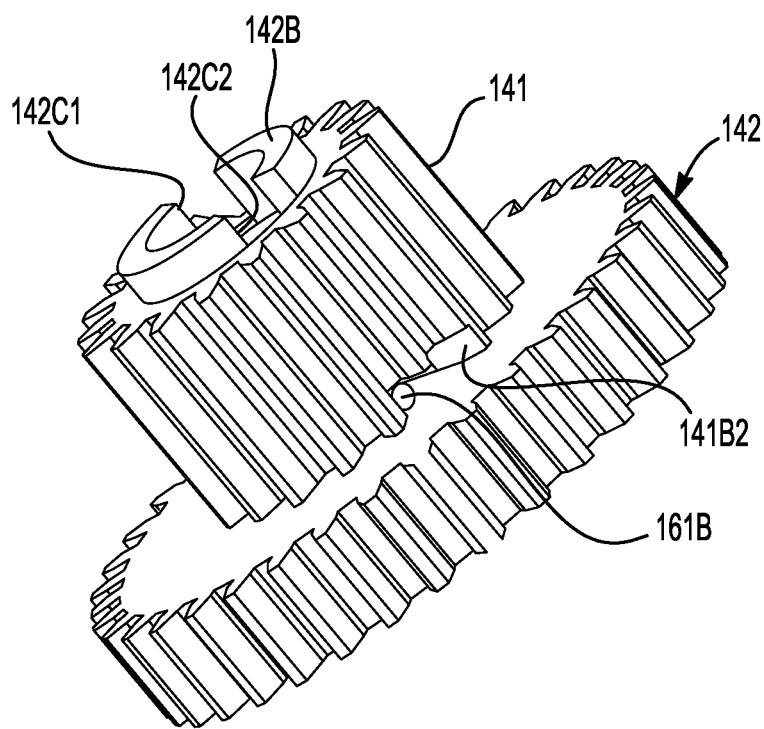
FIG. 7 illustrates the structure with part of the gear unit removed and the torsion spring.
Figure 8A:
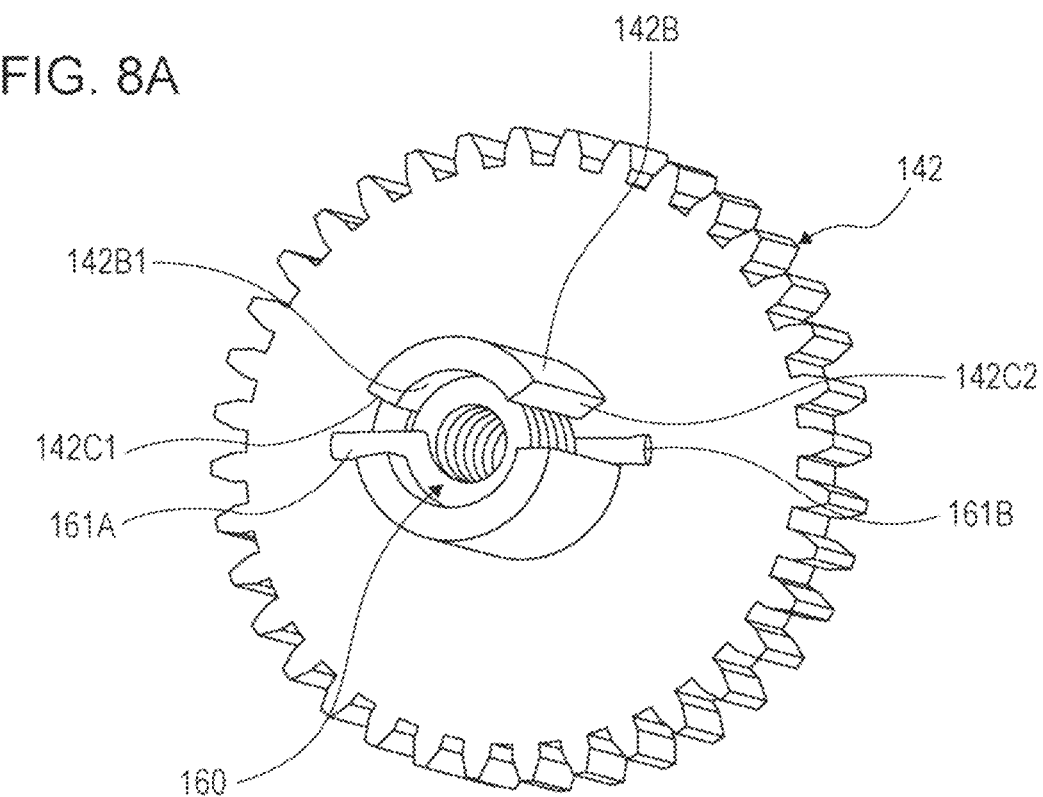
FIG. 8A illustrates the structure with part of the gear unit removed and the torsion spring.
Figure 8B:
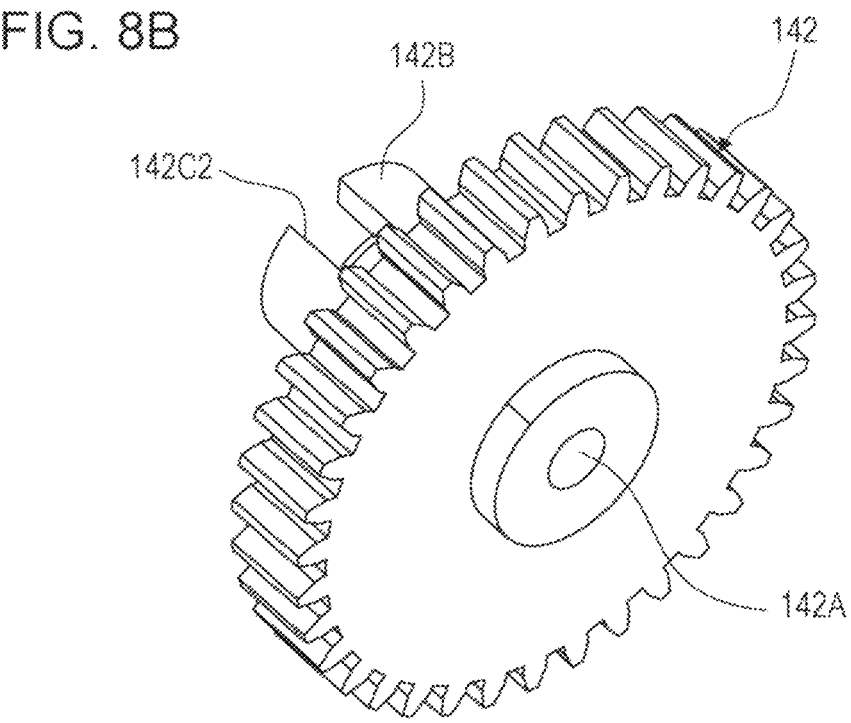
FIG. 8B illustrates a gear.

In an initial state, in the circumferential direction, the respective positions of radially extending walls of the cut portion 141B1 of the gear 141 and the cut portion 142C1 of the gear 142 are coincident with each other in plan view and arranged on a straight line. Thus, as shown in FIG. 6, an angle difference between the cut portion 141 B1 of the gear 141 and the cut portion 142C1 of the gear 142 is zero (reference angle $\theta_0$). Also, in the circumferential direction, the respective positions of radially extending walls of the cut portion 141B2 of the gear 141 and the cut portion 142C2 of the gear 142 are coincident with each other in plan view and arranged on a straight line. Thus, as shown in FIG. 7, an angle difference between the cut portion 141B2 of the gear 141 and the cut portion of the gear 142 that faces the cut portion 142C2 of the gear 142 is zero (reference angle $\theta_0$). This state in which the positions of the walls in the circumferential direction are coincident with each other and arranged on the straight lines are defined as a reference angle ($\theta_0$) state (hereinafter, referred to as "reference angle state") of the gear 141 and gear 142. The illustration of FIG. 6 corresponds to the reference angle state of the gear 141 and gear 142. In the reference angle state, the linear end portions 161A, 161B of the torsion spring 160 can be in contact with the walls of the corresponding cut portions at the same time. Thus, urging force of the same magnitude is applied to both the gear 141 and the gear 142 so as to act to maintain the reference angle state in which the walls of the cut portions are coincident with each other in a linear manner. As discussed below in detail, when the rotor 150 is rotated and, depending on a state of the motor 130, the gear 141 rotates to a rotation angle $\theta_1$ from the reference angle $\theta_0$ and the gear 142 rotates to a rotation angle $\theta_2$ from the reference angle $\theta_0$ (see FIG. 6). However, the states of the gear 141 and the gear 142 after the gear 141 and the gear 142 rotate to the rotation angle $\theta_1$ and the rotation angle $\theta_2$, respectively, are not shown in FIG. 6. An angle difference between the rotation angle $\theta_1$ and the rotation angle $\theta_2$ is a relative angle $\theta_R$ (see FIG. 6). A state in which the angle difference between the rotation angle $\theta_1$ of the gear 141 and the rotation angle $\theta_2$ of the gear 142 is the relative angle $\theta_R$, is defined as a relative angle (θR) state (hereinafter, referred to as "relative angle state") of the gear 141 and the gear 142. Furthermore, in the above-described initial state and a state, to be described later, in which rotation operation for the rotor 150 and rotation of the motor 130 are canceled, both the gear 141 and the gear 142 are returned from the relative angle state to the reference angle state due to the urging force of the torsion spring 160.

A bearing portion 143 is a substantially L-shaped component having two surfaces that are provided between the shaft portion 142B of the gear 142 and a lower surface of the base plate 125 and that intersect each other. By one of the surfaces, the shaft portion 142B of the gear 142 is rotatably supported and the accommodation portion 142B1 that accommodates the torsion spring 160 is lidded on the Y-axis positive side. Also in the bearing portion 143, a distal end portion of the rotation shaft 135A is rotatably supported by a recess (not illustrated) of the other surface so as to hold the rotation shaft 135A on the X axis. In this way, even when the worm gear 135 is subjected to reactive force from the gear 141, the worm gear 135 can be reliably engaged with the gear 141 without bending of the rotation shaft 135A.

The rotor 150 has a cylindrical portion 151 and a cylindrical portion 152. Central axes of the cylindrical portion 151 and the cylindrical portion 152 are the central axis C. Such a rotor 150 is formed of, for example, molded resin. The diameter of the rotor 150 is about 50 mm. Preferably, the rotor 150 is a hollow rotor in which the inside of the cylindrical portion 151 and the cylindrical portion 152 is hollowed out.

The rotor 150 is directly touched for operation by the operator of the input device 100. Thus, the rotor 150 is utilized as a knob. Although a form in which the operator directly touches the rotor 150 for operation is described herein, a cover-shaped separate member that covers the rotor 150 may be provided, or movable separate member may be engaged. In these cases, the operator touches the separate member to indirectly operate the rotor 150.

The cylindrical portion 151 is positioned above (Y-axis positive side) the cylindrical portion 152 and has the outer diameter and the inner diameter that are greater than those of the cylindrical portion 152. The cylindrical portion 151 is connected to an upper side of the cylindrical portion 152. In the rotor 150, the cylindrical portion 151 is a part directly touched by the operator.

An outer circumference of the cylindrical portion 152 is greater than an inner circumference of the cylindrical portion 151 and smaller than an outer circumference of the cylindrical portion 151. The thickness of the cylindrical portion 152 and the thickness of the cylindrical portion 151 are substantially the same. A step is formed between the cylindrical portion 152 and the cylindrical portion 151 in sectional view.

The cylindrical portion 152 is fitted into a gap between the cylindrical portions 111, 112 and rotatably supported relative to the base portion 110. When the cylindrical portion 152 is fitted into the gap between the cylindrical portions 111, 112, an engagement portion 112A provided on an outer circumferential surface of the cylindrical portion 112 is engaged with the step between the cylindrical portions 152, 151. Thus, the rotor 150 is fitted into the base portion 110.

Preferably, the gear 152A is formed at a lower end of an inner circumferential surface of the cylindrical portion 152 in the circumferential direction (rotation direction). The gear 152A is a spur gear provided throughout an inner circumference of the cylindrical portion 152. The gear 152A is an example of a third gear.

The gear 152A appears between four projections 122A when seen from the inside of the cylindrical portion 112 of the base portion 110. The gear 152A is meshed (engaged) with the gear 142 of the gear unit 140. Accordingly, when the operator applies force so as to rotate the rotor 150, rotation force is transmitted from the gear 152A to the gear 142. The rotation force is transmitted from the gear 142 to the gear 141 via the torsion spring 160, and then transmitted to the worm gear 135.

The torsion spring 160 is a torsion coil spring that has the end portions 161A, 161B and is wound into a spiral shape between the end portions 161A, 161B. The torsion spring 160 is an example of an elastic member. The torsion spring 160 is attached to the shaft portion 142B such that the end portions 161A, 161B are respectively positioned at the cut portions 142C1, 142C2 and the winding portion is accommodated in the accommodation portion 142B1. Preferably, the end portion 161A is engaged with the cut portion 141B1 of the gear 141 rotatably supported by the shaft portion 142B, and the end portion 161B is engaged with a cut portion 141B2 of the gear 141 rotatably supported by the shaft portion 142B.

Preferably, the angle sensors 170 has two angle sensors 170A, 170B. The angle sensors 170A, 170B include, for example, magnetic sensors. The angle sensors 170 are an example of an angle detection unit. The angle sensors 170A, 170B are respectively examples of a first angle detection unit and a second angle detection unit.

As illustrated in FIG. 9, the angle sensor 170A is attached to the lower surface of the base plate 125. The position of the angle sensor 170A in plan view is near the rotation center of the gear 141. The reason for this is to detect a rotation angle (for example, the rotation angle $\theta_1$ shown in FIG. 6) of the gear 141 (an example of a first rotation angle) by detecting, with the angle sensor 170A, variation of a magnetic flux of a magnet (not illustrated) unitarily rotated with the gear 141.

Figure 10:
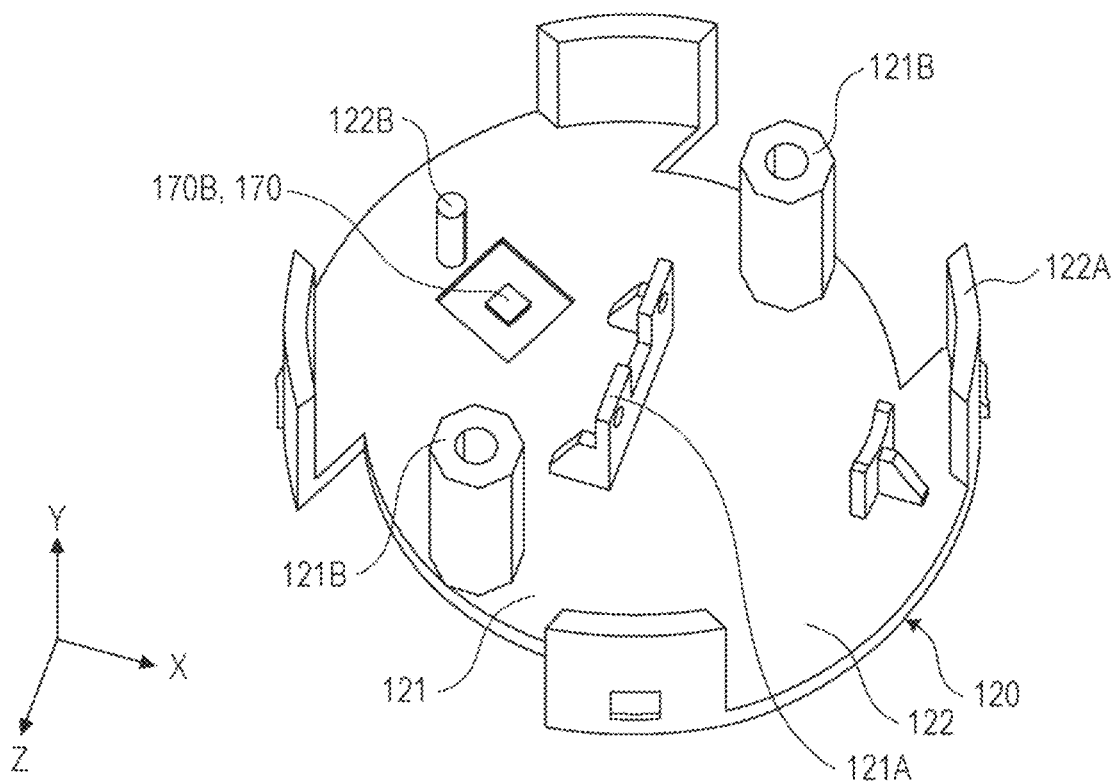
FIG. 10 illustrates the angle sensors.

As illustrated in FIG. 10, the angle sensor 170B is disposed near the shaft portion 122B of the seating 120. The position of the angle sensor 170B in plan view is near the rotation center of the gear 142. The reason for this is to detect a rotation angle (for example, the rotation angle $\theta_2$ shown in FIG. 6) of the gear 142 (an example of a second rotation angle) by detecting, with the angle sensor 170B, variation of a magnetic flux of a magnet (not illustrated) unitarily rotated with the gear 142. The rotor 150 is usually rotated while being engaged with the gear 142. Thus, data of the rotation angle of the gear 142 detected by the angle sensor 170B may be transmitted to the controller so as to calculate the rotation angle of the rotor 150 by the controller based on the gear ratio between the gear 142 and the rotor 150.

In the input device 100 having the structure as described above, when the operator applies force so as to rotate the rotor 150, the rotation force is transmitted from the gear 152A to the gear 142 of the gear unit 140, and the rotation force is transmitted to the gear 141 via the torsion spring 160. At this time, due to a self-locking effect of the worm gear by which the worm gear 135 cannot be rotated from the worm wheel side when the worm gear 135 is not rotated by the motor 130, the gear 141 cannot rotate the worm gear 135 even in the case where the gear 141 attempts to rotate the worm gear 135. Thus, the relative angle state in which the gear 142 is rotated relative to the gear 141 is assumed from the initial state (reference angle state) in which the relative angle between the gear 141 and the gear 142 is zero degrees, and the angle formed between both the end portions of the torsion spring 160 is further enlarged. This generates restoring force in a direction in which the angle formed between both the end portions of the torsion spring 160 is narrowed. The magnitude of the restoring force varies in proportion to the size of the relative angle between the gear 142 and the gear 141. The restoring force is an example of urging force.

Furthermore, when the operator applies force so as to rotate the rotor 150, the rotation force is transmitted from the gear 152A to the gear 142, and the rotation force is transmitted to the gear 141 via the torsion spring 160, in the case where the worm gear 135 is rotated by the motor 130 in the opposite direction to the rotation direction of the gear 141 such that the worm gear 135 is rotated at the same movement speed as the rotation speed of the gear 141, the gear 141 is rotated by the gear 142 via the torsion spring 160 without load. Accordingly, the rotation can be performed while maintaining the initial state (reference angle state) in which the relative angle between the gear 141 and the gear 142 is zero degrees, and the angle formed between both the end portions of the torsion spring 160 is unchanged. Thus, the torsion spring 160 does not generate the restoring force.

When the operator applies force so as to rotate the rotor 150, the rotation force is transmitted from the gear 152A to the gear 142, and the rotation force is transmitted to the gear 141 via the torsion spring 160, in the case where the worm gear 135 is rotated by the motor 130 in the opposite direction to the rotation direction of the gear 141 such that the worm gear 135 is rotated at a lower movement speed than the rotation speed of the gear 141, due to delay in rotation of the gear 141 by the difference between the movement speeds, the relative angle state in which there is a relative angle between the gear 141 and the gear 142 is assumed from the initial state (reference angle state) in which the relative angle between the gear 141 and the gear 142 is zero degrees. Consequently, compared to the above-described case where the worm gear 135 is not rotated by the motor 130, the relative angle is small and the angle formed between both the end portions of the torsion spring 160 is enlarged by a small amount, thereby the torsion spring 160 generates small restoring force corresponding to the relative angle.

The restoring force of the torsion spring 160 acts on the gear 142 as rotation torque in a returning direction to the initial state (reference angle state) in which the relative angle between the gear 141 and the gear 142 is zero degrees and is added as the rotation torque to the rotor 150 via the gear 152A.

Controlling the rotation of the worm gear with the motor 130 as described above allows realization of a desired state from a state without the relative angle to a state with any of various sizes of the relative angle, that is, a state without the restoring force to a state with any of various magnitudes of the restoring force.

The size of the relative angle when the torsion spring 160 is enlarged can be detected by calculation with the controller based on the respective rotation angles of the gear 141 and the gear 142 detected by the angle sensor 170A and the angle sensor 170B. Thus, the magnitude of the restoring force of the torsion spring 160 can be controlled by controlling drive of the motor 130 in accordance with the size of the relative angle detected by the controller.

Accordingly, when the operator applies force to rotate the rotor 150, rotation torque based on the restoring force of the torsion spring 160 the magnitude of which is controlled is added to the hand of the operator who performs rotation operation on the rotor 150 and acts as a sense of force.

At this time, the controller drives the motor 130 in a direction in which the restoring force of the torsion spring 160 is assisted (direction in which the relative angle is becoming zero degrees) or in a direction in which the restoring force is limited (direction in which the relative angle is increased) so as to apply the sense of force to the hand of the operator who operates the rotor 150.

Figure 11:
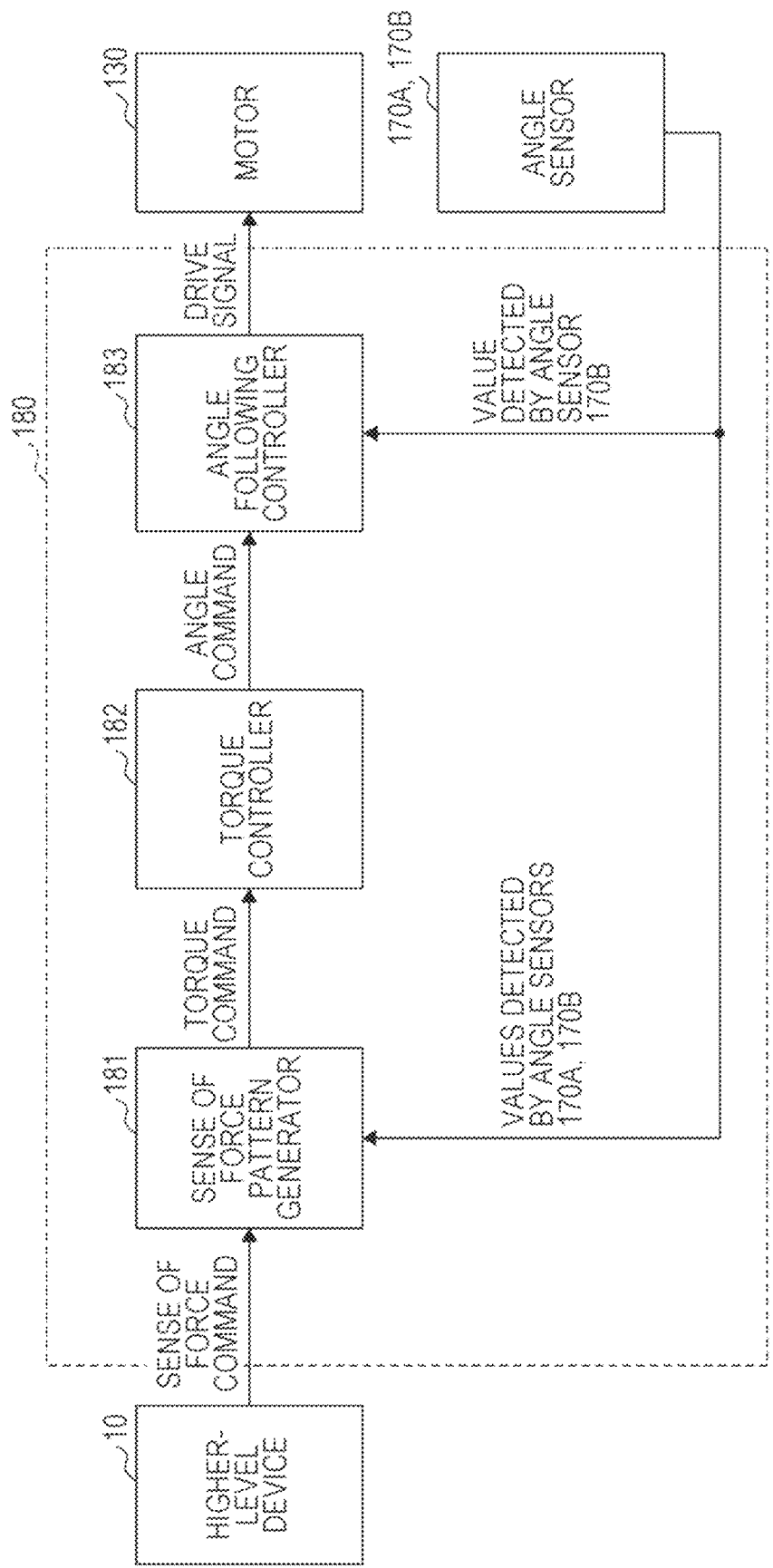
FIG. 11 illustrates a control system of the input device.

FIG. 11 illustrates a control system of the input device 100. In FIG. 11, a higher-level device 10 is illustrated in addition to a controller 180, the motor 130, and the angle sensors 170A, 170B of the input device 100.

Although the structure between the motor 130 and the angle sensors 170A, 170B (worm gear 135, gear unit 140) is omitted from FIG. 11, when the motor 130 is rotated, drive force is transmitted to the rotor 150 via the worm gear 135 and the gear unit 140, and the rotation angles of the gear 141 and the gear 142 of the gear unit 140 are detected by the angle sensors 170A, 170B.

The higher-level device 10 is, for example, an electronic control unit (ECU) of any of various devices mounted on a vehicle such as a navigation device and an air conditioner. The higher-level device 10 is realized by a computer that includes a central processing unit (CPU), a random-access memory (RAM), a read-only memory (ROM), a hard disk drive (HDD), an input/output interface, an internal bus, and so forth.

The higher-level device 10 stores in memory data indicative of sense of force commands corresponding to the senses of force provided when the input device 100 is operated in accordance with input modes of the input device 100 and outputs a sense of force command corresponding to a selected input mode to the controller 180. The input mode is, for example, a mode for operation of one of the navigation device, air conditioner, and the like. In accordance with the input mode, display content of the display provided in the dashboard is switched to that of the navigation device, the air conditioner, or the like. Due to the sense of force commands corresponding to the input modes, the sense of force such as, for example, a strong clicking sensation and a weak clicking sensation or continuous predetermined rotation load torque are provided.

The controller 180 includes a sense of force pattern generator 181, a torque controller 182, and an angle following controller 183.

The sense of force pattern generator 181 obtains respective angles of the gears 141, 142 relative to a reference angle from rotation amounts detected by the angle sensors 170A, 170B and obtains the relative angle of the gears 141, 142 relative to the reference angle. The sense of force pattern generator 181 generates a torque command based on the sense of force command input from the higher-level device 10 and the relative angle and outputs the generated torque command to the torque controller 182.

When the sense of force pattern generator 181 generates the torque command for the predetermined angle of the rotor 150 by using the relative angle, a predetermined force-stroke (FS) characteristic is utilized for conversion. The sense of force pattern generator 181 converts torque for the predetermined angle of the rotor 150 corresponding to the type of the sense of force command into a stroke. The converted stroke is converted into the relative angle relative to the reference angle by applying the FS characteristic so as to generate the torque command.

The torque controller 182 performs a conversion process to convert into the rotation angle of the rotation shaft 135A of the motor 130 the relative angle relative to the reference angle indicated by the torque command input from the sense of force pattern generator 181, thereby generating an angle command. The torque controller 182 outputs the angle command to the angle following controller 183. The torque controller 182 generates the angle command for the rotation angle of the rotation shaft 135A of the motor 130 to move the relative angle in the direction in which the restoring force of the torsion spring 160 is assisted or in the direction in which the restoring force is limited.

The angle following controller 183 obtains the current angle of the rotor 150 relative to the reference angle from the rotation angle detected by the angle sensor 170B and obtains the current relative angle between the gears 141, 142 from the angle sensors 170A, 170B. The angle following controller 183 performs feedback control based on a target relative angle relative to the predetermined angle of the rotor 150 in accordance with the angle command input from the torque controller 182 and the current relative angle between the gears 141, 142, thereby generating a drive signal for performing drive control for the motor 130.

The angle following controller 183 generates the drive signal so that the relative angle between the gears 141, 142 is coincident with the angle indicated by the angle command. The drive signal is, for example, a pulse width modulation (PWM) signal, and the angle following controller 183 determines a duty ratio by performing the feedback control.

As described above, the input device 100 includes the gear unit 140 (gears 141, 142) that is rotated as the rotor 150 is rotated, the worm gear 135, and the torsion spring 160 that generates the restoring force which suppresses an increase in relative angle between the gears 141, 142. In addition, the input device 100 includes the motor 130 that rotates the worm gear 135 which changes the relative angle between the gears 141, 142 so as to assist or limit the restoring force.

When the rotor 150 is operated, the rotation of the worm gear 135 is controlled, in accordance with the relative angle between the gears 141, 142, by the motor 130 in the direction in which the restoring force of the torsion spring 160 is assisted or to limit the restoring force.

The sense of force provided to the hand of the operator by the input device 100 having the structure as described above is realized by the rotation torque added as the restoring force of the torsion spring 160 changes. Regarding torque of the motor 130 that rotates the worm gear 135 to assist or limit the restoring force of the torsion spring 160, compared to the case of, for example, the related-art device in which the motor is directly connected to the rotor and the sense of force is realized by the changes in the rotation torque of the motor itself, the drive torque of the motor 130 can be significantly reduced.

Thus, the input device 100 can provide the sense of force with the structure that uses the size-reduced motor 130 compared to the related-art device.

Thus, according to the embodiment, the size-reduced input device 100 can be provided.

Furthermore, since the rotation control is performed on the motor based on the angle sensors 170 provided at a location other than that in the motor, the motor itself is not required to have a highly accurate rotation angle detection mechanism or the like. This can drop the need of providing in the motor the structure that would otherwise be necessary for the rotation control of the motor. Accordingly, the structure of the motor can be simplified, and the size of the motor 130 can be reduced.

Furthermore, since the worm gear 135 is used, when the self-locking effect of the worm gear 135 is utilized, the holding torque of the motor 130 is reduced in the case where the motor 130 generates the torque that limits the restoring force. Also from such a viewpoint, the size of the motor 130 can be reduced, and the size of the input device 100 can be reduced. The restoring force of the torsion spring 160 is connected, via the gear unit 140, to the gear 152A of the rotor 150 that has many teeth. Thus, a large reduction ratio can be obtained when seen from the torsion spring 160 side. Accordingly, even when the torque generated by the restoring force of the torsion spring 160 is small, a sufficient sense of force can be provided. Also from such a viewpoint, the size of the input device 100 can be reduced.

Furthermore, various senses of force can be realized by changing the drive torque of the motor 130 in a time-series manner. For example, when drive patterns of the motor 130 are provided so as to vary the sense of force in accordance with types of various devices such as the navigation device, air conditioner, and the like or types of operation content, the operator can check the operation content or perceive the completion of operation only by the sense of force.

Although the form in which the drive shaft 130A of the motor 130 and the rotation shaft 135A are perpendicular to the central axis C has been described above, the drive shaft 130A of the motor 130 or the rotation shaft 135A is not necessarily perpendicular to the central axis C.

Furthermore, although the form in which the input device 100 includes the worm gear 135, the gear unit 140 (gears 141, 142), and the gear 152A has been described above, the structure of the gears or teeth is not limited to the above-described structure and may have another structure.

Figure 12:
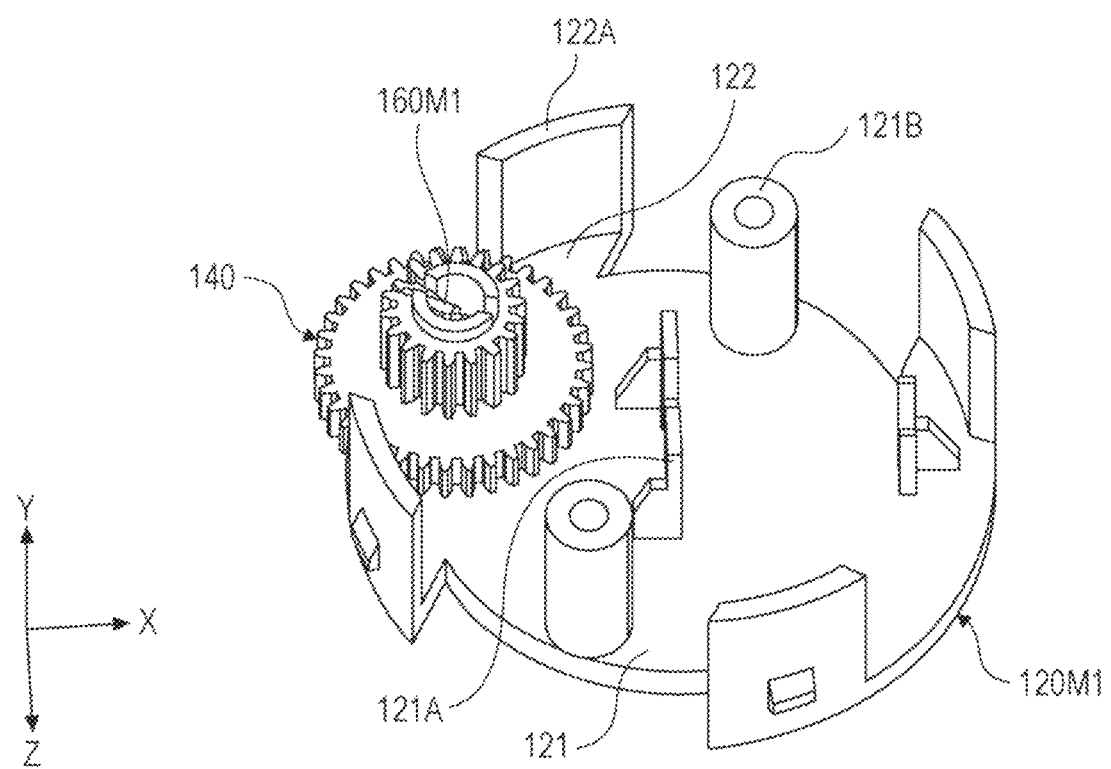
FIG. 12 illustrates a variation according to the embodiment.
Figure 13:
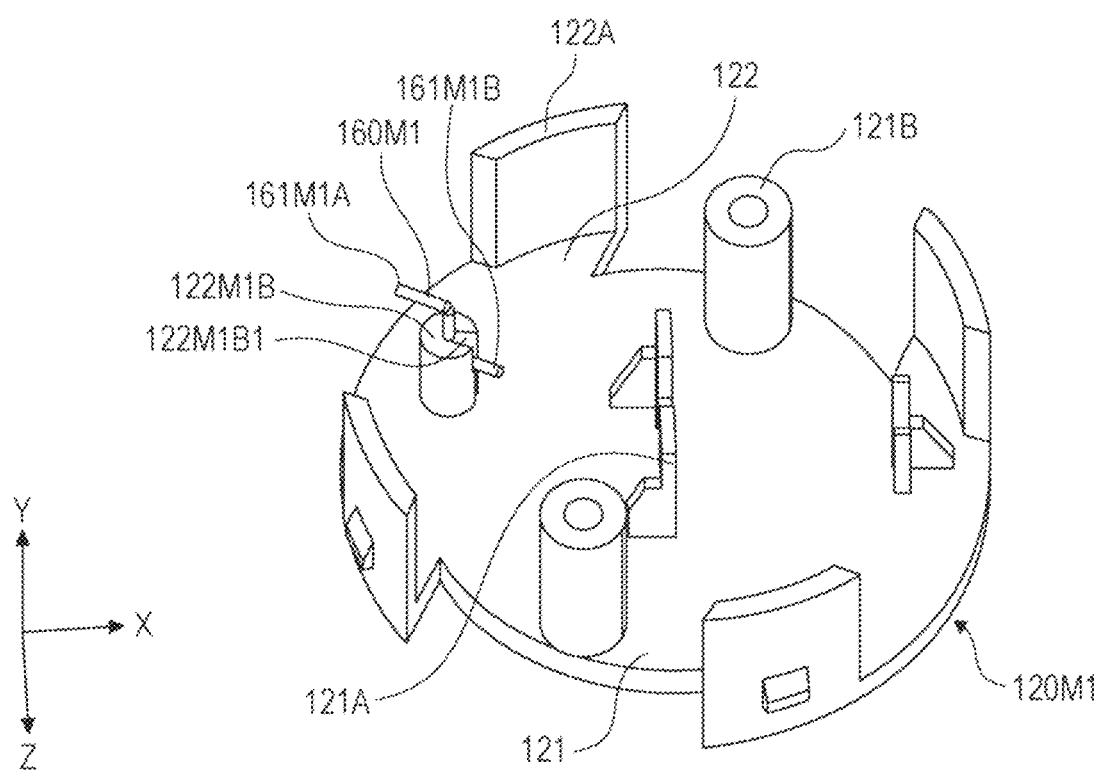
FIG. 13 illustrates the variation according to the embodiment.

Furthermore, although the form in which the torsion spring 160 is used has been described above, this form may be varied as illustrated in FIGS. 12 and 13. FIGS. 12 and 13 illustrate a variation according to the embodiment.

As illustrated in FIG. 12, a seating 120M1 may be included instead of the seating 120 illustrated in FIGS. 1 to 10, and a torsion spring 160M1 illustrated in FIG. 13 may be included instead of the torsion spring 160.

The seating 120M1 has a shaft portion 122M1B instead of the shaft portion 122B of the seating 120 illustrated in FIG. 10. The shaft portion 122M1B has a cut 122M1B1 for holding the torsion spring 160M1 in a cylindrical member so as to match the torsion spring 160M1.

The torsion spring 160M1 is formed by bending a metal bar into a crank shape and, as illustrated in FIG. 13, attached to the shaft portion 122M1B. When a lower end portion of the torsion spring 160M1 as described above is engaged with the gear 141 and the gear 142 and an upper end portion of this torsion spring 160M1 is engaged with the gear 141 and the gear 142, operation similar to that in the case where the torsion spring 160 is used can be realized. That is, urging force due to restoring force of the torsion spring 160M1 can be generated in a direction in which the relative angle formed between the gear 141 and the gear 142 is reduced.

Although the input device according to the exemplary embodiment of the present invention has been described above, the present invention is not limited to the specifically disclosed embodiment and can be varied or modified in various manners without departing from the scope of the claims.

What is claimed is:

1. An input device comprising:
   a base member;
   a motor attached to the base member;
   a rotation shaft configured to be rotated by the motor;
   a worm gear configured to be unitarily rotated with the rotation shaft;
   a first gear that is provided so as to be rotatable relative to the base member and that is engaged with the worm gear;
   a second gear that is provided so as to be coaxial with the first gear and that is provided so as to be rotatable relative to the base member;
   an elastic member that is provided between the first gear and the second gear and that is configured to generate urging force in a direction in which a relative angle between the first gear and the second gear from a reference angle state in a rotation direction is reduced;
   a rotor that is provided so as to be rotatable relative to the base member, that includes a third gear engaged with the second gear, and that is configured to undergo rotation operation performed by an operator;
   an angle detection unit configured to detect a first rotation angle of the first gear and a second rotation angle of the second gear; and
   a controller configured to perform drive control for the motor in accordance with a relative angle between the first rotation angle and the second rotation angle so as to change a sense of force applied to the operator via the rotor.

2. The input device according to claim 1, wherein the angle detection unit includes
   a first angle detection unit configured to detect the first rotation angle, and
   a second angle detection unit configured to detect the second rotation angle.

3. The input device according to claim 1, wherein the rotor is hollow, and the third gear is provided in the rotation direction in an inner circumferential surface of the rotor.

4. The input device according to claim 1, wherein the elastic member is a torsion spring engaged with the first gear and the second gear at one end portion and another end portion, respectively, and configured to generate the urging force in the direction in which the relative angle from the reference angle state is reduced.

5. The input device according to claim 1, wherein the motor and the rotation shaft are provided so as to be perpendicular to a rotation central axis of the rotor.

* * * * *